(12) United States Patent
Jenski

(10) Patent No.: US 10,619,786 B2
(45) Date of Patent: Apr. 14, 2020

(54) FIREPROOF QUICK DISCONNECT COUPLING ASSEMBLY

(71) Applicant: Eaton Corporation, Cleveland, OH (US)

(72) Inventor: Gary M. Jenski, Jackson, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 61 days.

(21) Appl. No.: 15/562,648

(22) PCT Filed: Apr. 20, 2016

(86) PCT No.: PCT/US2016/028375
§ 371 (c)(1),
(2) Date: Sep. 28, 2017

(87) PCT Pub. No.: WO2016/172163
PCT Pub. Date: Oct. 27, 2016

(65) Prior Publication Data
US 2018/0087708 A1    Mar. 29, 2018

Related U.S. Application Data

(60) Provisional application No. 62/152,365, filed on Apr. 24, 2015.

(51) Int. Cl.
*F16L 57/04* (2006.01)
*F16L 57/00* (2006.01)
(Continued)

(52) U.S. Cl.
CPC ............... *F16L 57/04* (2013.01); *F16L 15/08* (2013.01); *F16L 29/04* (2013.01); *F16L 57/005* (2013.01)

(58) Field of Classification Search
CPC .......... F16L 57/04; F16L 29/04; F16L 57/005
(Continued)

(56) References Cited

U.S. PATENT DOCUMENTS 3,916,488 A * 11/1975 Gazda .................. B29C 47/021
24/16 R
4,259,989 A * 4/1981 Lalikos ................. F16L 11/087
138/109

(Continued)

FOREIGN PATENT DOCUMENTS

| EP | 2639488 A1 | 9/2013 |
|---|---|---|
| WO | WO-88/08499 A1 | 11/1988 |
| WO | WO-2013030621 A1 | 3/2013 |

OTHER PUBLICATIONS

International Search Report PCT/US2016/028375, dated Jul. 7, 2016.

*Primary Examiner* — Anna M Momper
*Assistant Examiner* — Fannie C Kee
(74) *Attorney, Agent, or Firm* — Fishman Stewart PLLC

(57) ABSTRACT

A coupling assembly (20) is provided that includes a first coupling member (25), a second coupling member (24) configured to selectively connect with and disconnect from the first coupling member, a locking sleeve (42) configured to selectively release the first coupling member from the second coupling member; and a layered flame retardant structure (50). The layered flame retardant structure (50) may include a first flame retardant layer (52), a generally cylindrical sleeve (54) that extends over the first flame retardant layer, and a second flame retardant layer (56) that extends over a substantial portion of the generally cylindrical sleeve. In embodiments, the generally cylindrical sleeve (54) and the second flame retardant layer (56) may overhang the locking sleeve (42).

20 Claims, 3 Drawing Sheets

(51) Int. Cl.
*F16L 29/04* (2006.01)
*F16L 15/08* (2006.01)

(58) Field of Classification Search
USPC .................................................. 285/45, 55
See application file for complete search history.

(56) References Cited

U.S. PATENT DOCUMENTS

| | | | | |
|---|---|---|---|---|
| 4,675,221 | A * | 6/1987 | Lalikos | B25B 27/10 138/103 |
| 5,183,079 | A * | 2/1993 | Blin | F16L 11/086 138/110 |
| 5,985,385 | A * | 11/1999 | Gottfried | B32B 1/08 405/157 |
| 7,575,024 | B2 * | 8/2009 | Zeiber | F16L 29/04 137/614.03 |
| 8,176,943 | B2 * | 5/2012 | Stroempl | F16L 11/125 138/133 |
| 8,713,944 | B2 * | 5/2014 | Bleeker | F02C 7/222 60/739 |
| 2008/0271797 | A1 * | 11/2008 | Zeiber | F16L 29/04 137/614.05 |
| 2011/0000572 | A1 * | 1/2011 | Ramaswamy | B32B 1/08 138/149 |
| 2013/0263960 | A1 | 10/2013 | Cichorek et al. | |

* cited by examiner

FIREPROOF QUICK DISCONNECT COUPLING ASSEMBLY

CROSS-REFERENCE TO RELATED APPLICATION

This application claims priority to International Patent Application No. PCT/US2016/028375, filed Apr. 20, 2016, which claims the benefit to U.S. Provisional Application Ser. No. 62/152,365, filed Apr. 24, 2015, the contents of both are incorporated by reference in their entireties.

TECHNICAL FIELD

The present disclosure relates to fluid conveyance systems, including no-flow fireproof quick disconnect couplings.

BACKGROUND

The present disclosure relates to no-flow fireproof quick disconnect couplings utilized in fluid conveyance (e.g., hydraulic and fuel) applications that may be required to function in severe, high-temperature working environments. Specifically, this disclosure relates to improvements in several structures thereof that allow such couplings to meet the fire resistant and fireproof requirements of SAE AS1055 and other such related industry specifications with zero or very low fluid cooling flow

SUMMARY

A coupling assembly that may include a first coupling member that may include one of a first coupling portion and second coupling portion; a second coupling member that may include the other of the first coupling portion and the second coupling portion, the other of the first coupling portion and the second coupling portion may be configured to selectively connect with and disconnect from the first coupling portion and the second coupling portion; a locking sleeve that may be configured to selectively release the first coupling member from the second coupling member; and a layered flame retardant structure that may include a first flame retardant layer, a generally cylindrical sleeve configured to extend over the first flame retardant layer, and a second flame retardant layer that may be configured to extend over a substantial portion of the generally cylindrical sleeve.

DETAILED DESCRIPTION

Figure 1A:
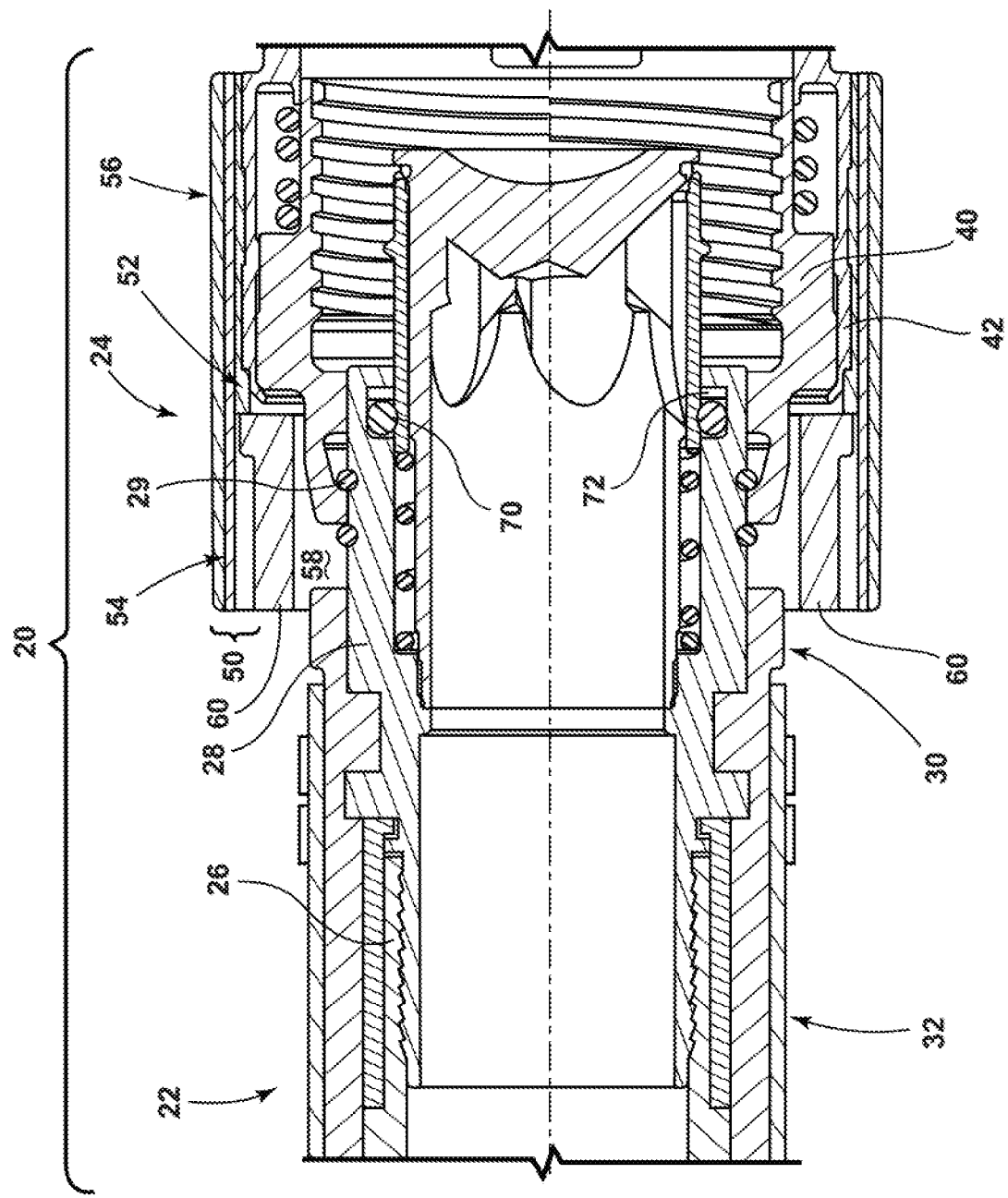
FIG. 1A is a cross-sectional view generally illustrating a fireproof quick disconnect coupling member including a flame retardant plug embodying principles of the present disclosure.
Figure 1B:
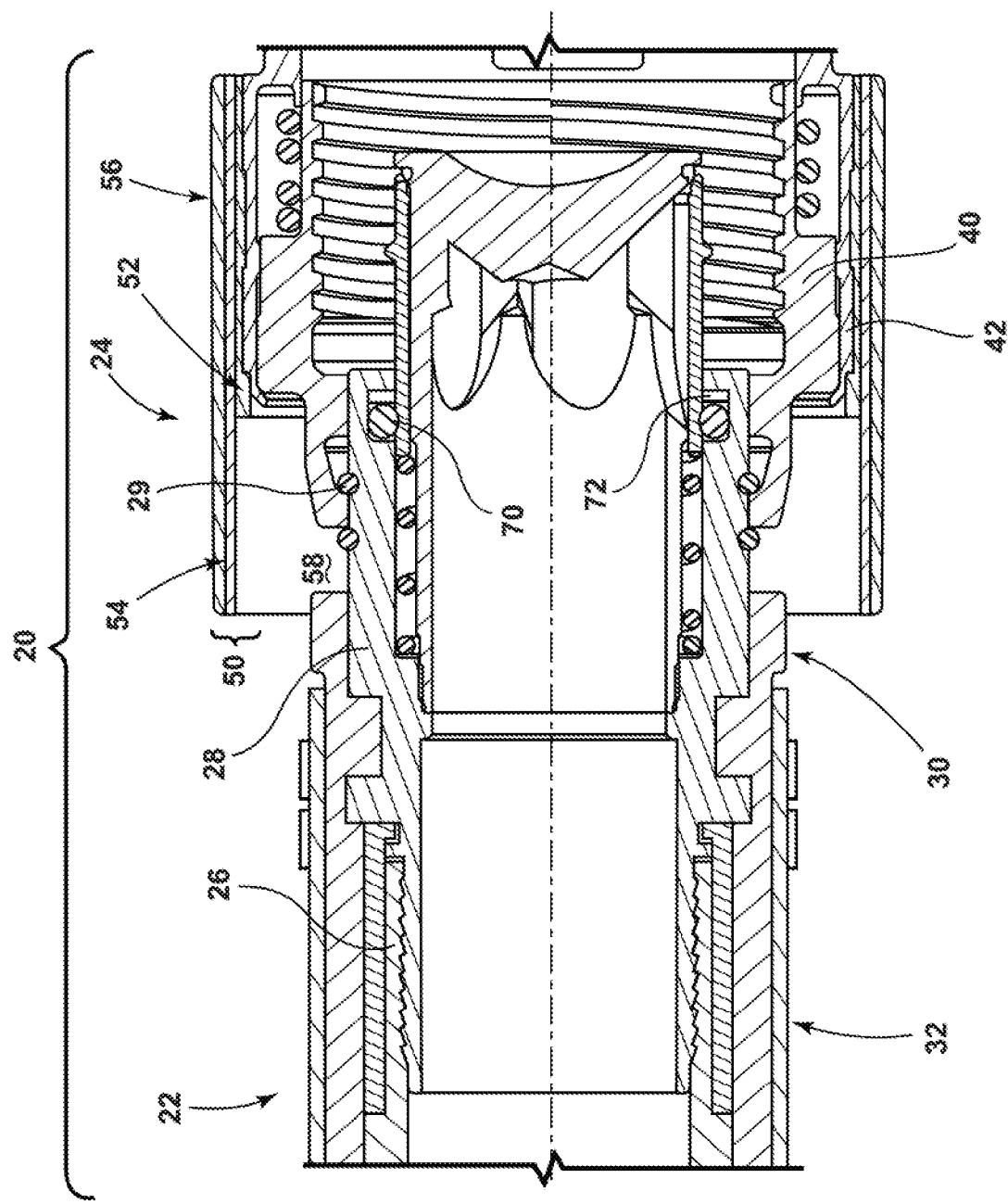
FIG. 1B is a cross-sectional view generally illustrating a fireproof quick disconnect coupling member embodying principles of the present disclosure.
Figure 2:
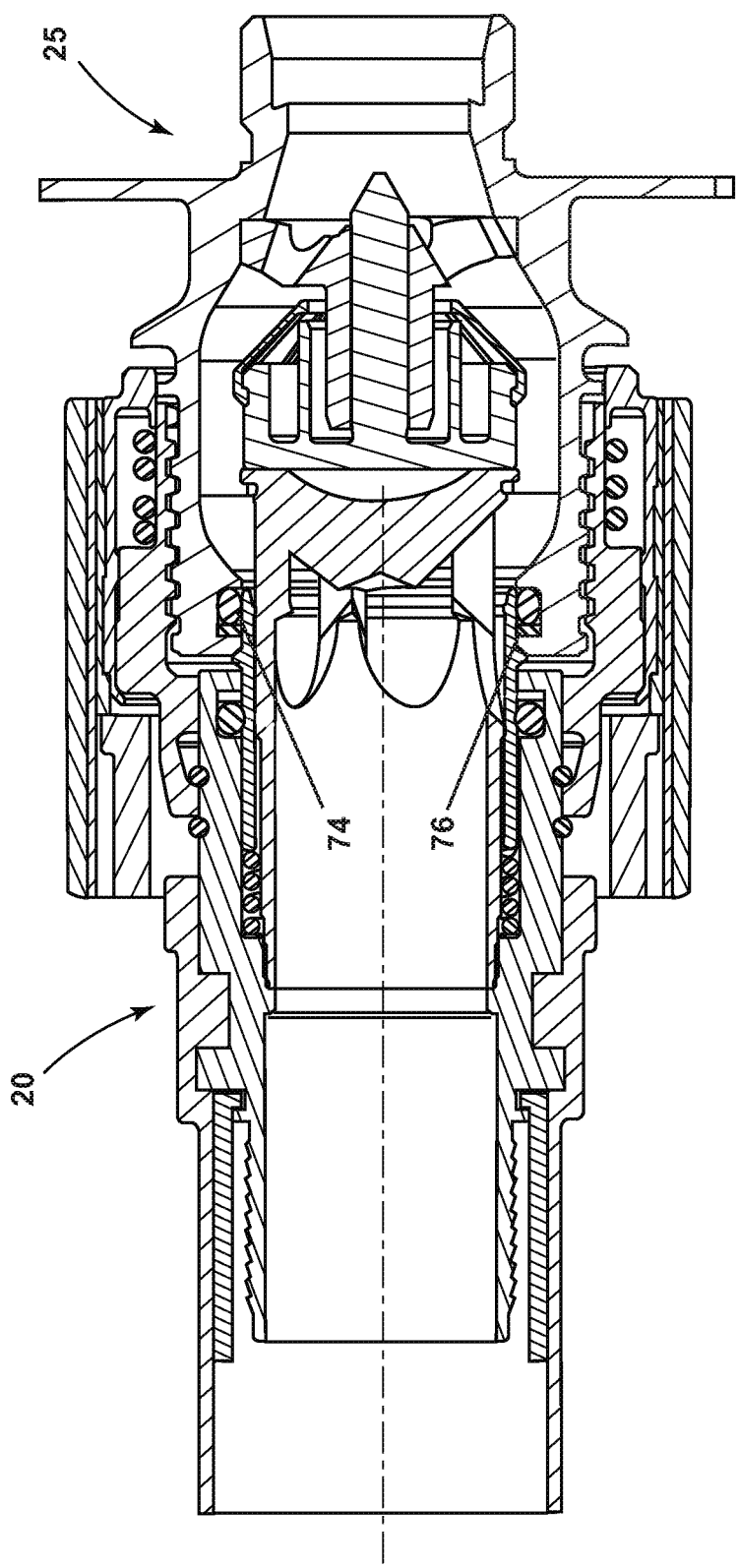
FIG. 2 is a cross-sectional view generally illustrating a fireproof quick disconnect coupling assembly embodying principles of the present disclosure.

Referring to FIGS. 1A, 1B, and 2, which are not intended to limit the present disclosure, FIGS. 1A and 1B generally illustrate a coupling member 20 that may include a perma- nently crimped hose member 22 and a female half coupling member 24. The female half coupling member 24 may be selectively connectable to and disconnectable from a male half coupling member 25, such as generally illustrated in FIG. 2. In embodiments, the female half coupling member 24 and the male half coupling member 25 may, when connected, comprise a coupling assembly that provides a sealed fluid connection for fluid conveyance. In embodiments, hose member 22 may include a hose assembly. The hose assembly may include a hose 26 and a combined one-piece hose nipple and quick disconnect adapter fitting 28. The fitting 28 may retain a nut sub-assembly. The nut sub-assembly may include a number of functional members, such as 40, 42, 50, and 60 (described in more detail below), that may be retained by at least one retaining ring 29.

In embodiments, the retaining ring 29 may be configured to allow the nut sub-assembly to rotate relative to the adapter fitting 28 when connecting female half coupling member 24 to a male half coupling member 25. To provide some measure of protection against damage due to exposure to fire, hose 26 and at least a portion of fitting 28 may be covered with a flame retardant material 30. For example, and without limitation, the flame retardant material 30 may comprise silicone rubber or other suitable material. An additional fire sleeve 32 may encapsulate at least a portion of the flame retardant material 30 such as generally illustrated in FIGS. 1A and 1B.

In embodiments, a female half coupling member 24 may include a receiving structure 40. The receiving structure 40 may be configured to receive and connect and/or engage with a male half coupling member 25. The receiving structure 40 and male half coupling member 25 may comprise a suitable number of configurations adapted to selectively receive, connect, and disconnect the female half coupling member 24 and male half coupling member 25. It should be understood that the above described examples are for illustrative purposes only and are not intended to be limited the scope of the present disclosure.

In embodiments, the female half coupling member 24 may be selectively releasable from the male half coupling member 25. For example, and without limitation, the female half coupling member 24 may include a locking sleeve 42. The locking sleeve 42 may be configured to be movable both axially and rotationally on the male half coupling member 25. The locking sleeve 42 may be configured to selectively release the male half coupling member 25 from the receiving structure 40. Locking sleeves having somewhat similar functionality may be known in the art. However, in contrast with such locking sleeves, the disclosed locking sleeve 42 may include a layered flame retardant structure 50. The layered flame retardant structure 50 may be configured to substantially cover the locking sleeve. In embodiments, the layered flame retardant structure 50 may include a first flame retardant layer (e.g., silicone rubber) 52, a metallic (e.g., stainless steel), generally cylindrical sleeve 54 that may extend over the first flame retardant layer 52, and a second flame retardant layer (e.g., silicone rubber) 56 that may extend over a substantial portion of the generally cylindrical sleeve 54.

In embodiments, the sleeve 54 and the second flame retardant layer 56 may overhang at least a portion of the locking sleeve 42 to form or create a gap 58 between the sleeve 54 and the fitting 28 and receiving structure 40. As is generally illustrated in FIG. 1B, the overhanging portion may extend beyond the locking sleeve 42 and over an otherwise exposed portion of the female half coupling member 24 adjacent the gap 58. In embodiments, such as generally illustrated in FIG. 1A, a generally cylindrical flame retardant plug (e.g., silicone rubber) 60 may be included in the gap 58, which together with the overhanging portion of the sleeve 54 and the second flame retardant layer 56, may inhibit flame propagation into the gap 58. It should be understood that the present disclosure contemplates embodiments that may or may not include a flame retardant plug, such as, for example, a silicone rubber plug 60.

In embodiments, the layered flame retardant structure 50 may be a reliable fireproof quick disconnect coupling assembly for, among other things, no flow or very low fluid flow operating conditions. For example, an integral hose and female half coupling member 24 and male half coupling 25 may retain sealing integrity and function for at least 15 minutes. A second flame retardant layer 56 may form ablative particles, the sleeve 54 may create a heat shield, and a first flame retardant layer 52 may create a thermal barrier. The thermal barrier may be configured to prevent excessive heat from reaching fluid seals (e.g., female half sealing member 70, back-up ring 72, male half sealing member 74, and back-up ring 76) of the integral hose and female half coupling member 24, which may otherwise facilitate or cause seal material break-down and eventual leakage of fluid from the integral female half coupling member 24 and male half coupling member 25. Known couplings that rely solely on molded silicone rubber over the outer locking sleeve commonly cannot maintain similar sealing integrity for a similar period of time.

In embodiments, a single flame retardant layer 52 may be provided between the locking sleeve 42 and the cylindrical sleeve 54. For example, and without limitation, a single flame retardant layer 52 may be thicker than the combined thickness of a second flame retardant layer 56 and a first flame retardant layer 52. In another embodiment, a single flame retardant layer 52 may be thicker than either of a second layer 56 and a first layer 52, yet not as thick as the combined thickness of the second layer 56 and the first layer 52. In embodiments utilizing a signal flame retardant layer 50, the cylindrical sleeve 54 may be the exposed outer layer and may act as a shield, and the single flame retardant layer 52 may act as a thermal barrier.

Various embodiments have been described in the foregoing specification, and it is believed that various alterations and modifications of the embodiments will become apparent to those skilled in the art from a reading and understanding of the specification. It is intended that all such alterations and modifications are included in the embodiments, insofar as they come within the scope of the appended claims.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements, relative movement between elements, physical connections (e.g., fluid connections), and/or electrical connections (wired and/or wireless). As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A coupling assembly, comprising:
   a first coupling member that includes a first coupling portion;
   a second coupling member that includes a second coupling portion, the first coupling portion and the second coupling portion being configured to selectively connect and disconnect;
   a locking sleeve at least partially surrounding the first coupling member and the second coupling member and configured to selectively release the first coupling member from the second coupling member; and
   a layered flame retardant structure including a first flame retardant layer, a generally cylindrical sleeve that is metallic and configured to extend over and be in direct contact with the first flame retardant layer, and a second flame retardant layer configured to extend over a substantial portion of the generally cylindrical sleeve.

2. The coupling assembly of claim 1, wherein the generally cylindrical sleeve and the second flame retardant layer are configured to extend beyond the locking sleeve.

3. The coupling assembly of claim 1, wherein the generally cylindrical sleeve and the second flame retardant layer are configured to extend over an otherwise exposed portion of the second coupling member to form a gap.

4. The coupling assembly of claim 3, wherein a flame retardant plug is provided within the gap.

5. The coupling assembly of claim 4, wherein the flame retardant plug is generally cylindrical.

6. The coupling assembly of claim 1, wherein the first coupling portion includes one of a male half coupling portion and a female half coupling portion and the second coupling portion includes the other of the male half coupling portion and the female half coupling portion.

7. The coupling assembly of claim 1, wherein the generally cylindrical sleeve and the second flame retardant layer are configured to overhang the locking sleeve.

8. The coupling assembly of claim 1, wherein the layered flame retardant structure is configured to cover the locking sleeve.

9. The coupling assembly of claim 1, wherein the locking sleeve is moveable axially and rotationally on the first coupling portion.

10. The coupling assembly of claim 1, wherein the second coupling portion includes a receiving structure configured to receive at least a portion of the first coupling portion.

11. A coupling assembly, comprising:
a first coupling member that includes a male half coupling portion;
a second coupling member that includes a female half coupling portion, the female half coupling portion having a receiving structure configured to selectively connect with and disconnect from the male half coupling portion;
a locking sleeve configured to selectively release the male half coupling portion from the receiving structure; and
a layered flame retardant structure that includes a first flame retardant layer, a generally cylindrical sleeve that is metallic and configured to extend over and be in direct contact with at least a portion of the first flame retardant layer, and a second flame retardant layer configured to extend over a substantial portion of the generally cylindrical sleeve.

12. The coupling assembly of claim 11, wherein the generally cylindrical sleeve and the second flame retardant layer are configured to extend beyond the locking sleeve.

13. The coupling assembly of claim 11, wherein the generally cylindrical sleeve and the second flame retardant layer are configured to extend over an otherwise exposed portion of the second coupling member to form a gap.

14. The coupling assembly of claim 13, wherein a flame retardant plug is provided within the gap.

15. The coupling assembly of claim 14, wherein the flame retardant plug is generally cylindrical.

16. The coupling assembly of claim 11, wherein the generally cylindrical sleeve and the second flame retardant layer are configured to overhang the locking sleeve.

17. The coupling assembly of claim 11, wherein the layered flame retardant structure is configured to cover the locking sleeve.

18. The coupling assembly of claim 11, wherein the locking sleeve is moveable axially and rotationally on the male half coupling portion.

19. The coupling assembly of claim 11, wherein the receiving structure is configured to receive at least a portion of the male half coupling portion.

20. A coupling assembly, comprising:
a first coupling member that includes a first coupling portion;
a second coupling member that includes a second coupling portion, the first coupling portion and the second coupling portion being configured to selectively connect with and disconnect from the other of the first coupling portion and the second coupling portion;
a locking sleeve at least partially surrounding the first coupling member and the second coupling member and configured to selectively release the first coupling portion from the second coupling portion, the locking sleeve being moveable axially and rotationally on the first coupling portion; and
a layered flame retardant structure configured to cover at least a portion of the locking sleeve, the layered flame retardant structure including a first flame retardant layer, a generally cylindrical sleeve that is metallic and extends over and is in direct contact with at least a portion of the first flame retardant layer, and a second flame retardant layer that extends over a substantial portion of the generally cylindrical sleeve, wherein the generally cylindrical sleeve and the second flame retardant layer overhang the locking sleeve.

\* \* \* \* \*